United States Patent
Jacob et al.

(10) Patent No.: US 6,174,240 B1
(45) Date of Patent: Jan. 16, 2001

(54) CONSTANT VELOCITY UNIVERSAL JOINT WITH LUBRICANT RESERVOIR

(75) Inventors: Achim Jacob, Kiel-Suchadorf; Werner Jacob, Frankfurt, both of (DE)

(73) Assignee: GKN Lobro GmbH (DE)

( * ) Notice: Under 35 U.S.C. 154(b), the term of this patent shall be extended for 0 days.

(21) Appl. No.: 08/931,557

(22) Filed: Sep. 16, 1997

(30) Foreign Application Priority Data

Sep. 21, 1996  (DE) .............................................. 196 38 780

(51) Int. Cl.⁷ ....................................................... F16D 3/22
(52) U.S. Cl. ............................ 464/145; 464/15; 464/906
(58) Field of Search .................................... 464/139, 140, 464/142, 143, 144, 145, 15, 16, 17, 906

(56) References Cited

U.S. PATENT DOCUMENTS

| | | | |
|---|---|---|---|
| 1,199,662 | * 9/1916 | Campbell | 464/15 |
| 1,294,583 | * 2/1919 | Whisler | 464/15 |
| 1,847,677 | * 3/1932 | Strenbergh | 464/15 |
| 1,980,846 | * 11/1934 | Bradley | 464/15 |
| 2,579,356 | * 12/1951 | Anderson | 464/906 |
| 2,822,880 | * 2/1958 | Gregory | 464/15 |
| 3,488,979 | * 1/1970 | Croset | 464/906 |
| 3,785,172 | * 1/1974 | Parsons | 464/906 |
| 4,777,008 | * 10/1988 | Shirasu | 376/204 |
| 5,368,523 | * 11/1994 | Mazziotti | 464/145 |

\* cited by examiner

Primary Examiner—Lynne H. Browne
Assistant Examiner—Kenneth Thompson

(57) ABSTRACT

A constant velocity universal joint has an outer part (1), an inner part (12) arranged in the outer part (1), and a cage (24) for guiding balls (23) each accommodated in an inner track (14) and an outer track (3). A control element (29) is arranged between the inner part (12) and a first attaching element (5) associated with the outer part (1). A second attaching part (18) is associated with the inner part (12). The second attaching element (18) is provided in the form of a tubular shaft. The invention provides advantageous lubrication conditions for the parts sliding on one another, i.e. the control face (17) and seat face (31) of the control element (29) on the one hand and the sliding face (10) as well as the contact face (30) of the control element (29) contacting the sliding face (10) on the other hand. Two chambers (9, 20) which accommodate lubricant and communicate with one another through an aperture (32) are provided. The chamber (20) is provided in the second attaching element by being separated from the remaining interior (22) by a separating element (21). In this way, an adequate lubricant reservoir is made available for the faces which slide on one another, the reservoir extending over the service life of the joint. The lubricant cannot escape outwardly when the joint rotates.

4 Claims, 1 Drawing Sheet

CONSTANT VELOCITY UNIVERSAL JOINT WITH LUBRICANT RESERVOIR

BACKGROUND OF THE INVENTION

The invention relates to a constant velocity universal joint having a hollow outer part whose inner face is provided with outer tracks distributed around a first longitudinal axis. A first attaching element is securely connected to the outer part, and which closes the outer part and comprises a sliding face on which the first longitudinal axis is positioned perpendicularly. An inner part has an outer face with inner tracks circumferentially distributed around a second longitudinal axis to correspond to the outer tracks, and whose outside comprises a spherical guiding face and a separate spherical control face. A second attaching element is connected to the inner part in a rotationally fixed way. Balls are accommodated in the pairs of outer tracks and inner tracks, and have a cage which, by means of a hollow spherical supporting face, is guided on the spherical guiding face of the inner part and which comprises windows for guiding the balls. A control element by means of a contact face, is radially adjustably supported with reference to the first longitudinal axis, on the sliding face of the first attaching element associated with the outer part, and comprises a hollow spherical seat face. The inner part, by means of its control face, is supported on the seat face and with the cage, with its outer face, is held at a distance from the inner face of the outer part and with the control element comprising a central aperture. Further a sealing sleeve is provided which, at one end, is secured to the outer part and at the other end to the second attaching part.

This type constant velocity universal joint is described in DE 39 04 655 C1, wherein, in the center of the inner part, opposite the aperture of the control element, there is provided a small recess to prevent any contact between the two parts.

It is the object of the invention to ensure advantageous sliding conditions for the faces sliding on one another, even under impact loads, i.e. to improve the lubrication of the faces.

SUMMARY OF THE INVENTION

In accordance with the invention, the above objective is achieved in that the first attaching element has a first chamber which is open towards the contact face of the control element. The inner part and/or a second attaching element connected to the inner part has a second chamber open towards the seat face, and both chambers communicate with one another through an aperture and are filled with lubricant.

The advantage of this embodiment is that in the region of the faces sliding on one another, i.e. of the control face and the seat face on the one hand and of the sliding face and the contact face on the other hand, there is made available a sufficiently large lubricant reservoir in an encapsulated form. The lubricant reservoir achieves adequate lubrication for the service life of the joint, and it is ensured that only a permissible amount of lubricant, i.e. as much lubricant as is required for lubricating said faces, can escape from this region. During articulation, portions of the guiding face and of the control face come into contact with the lubricant contained in the reservoir as formed, so that continuous lubrication is ensured. In this way, it is possible to achieve sliding conditions located in the region of fluid friction, with the lubrication film being maintained even under impact loads. The same applies to the control element with its contact face which, relative to the sliding face of the second attaching element only, carries out small radial movements.

According to a further, particularly advantageous embodiment it is proposed that the second attaching element is provided in the form of a tubular shaft and that the second chamber is formed by part of the interior of the tubular shaft. In this way, it is possible to make available a relatively large reservoir. The tubular shaft can be used to provide the second chamber. The size can be varied in that the second chamber located in the interior of the second attaching element provided in the form of a tubular shaft can be separated from the remaining space in the tubular shaft by a separating element. The location of the separating element can be varied, i.e. depending on the application in question, the separating element can be positioned in such a way that a sufficiently large chamber is formed. The separating element is preferably provided by a plug. The plug is preferably made of plastics and is pressed in and held as a result of its elastic properties. The size of the second chamber can be determined by the position of the plug in the interior.

BRIEF DESCRIPTION OF THE DRAWINGS

A preferred embodiment of the invention is illustrated in the drawings.

DETAILED DESCRIPTION OF A PREFERRED EMBODIMENT

Figure 1:
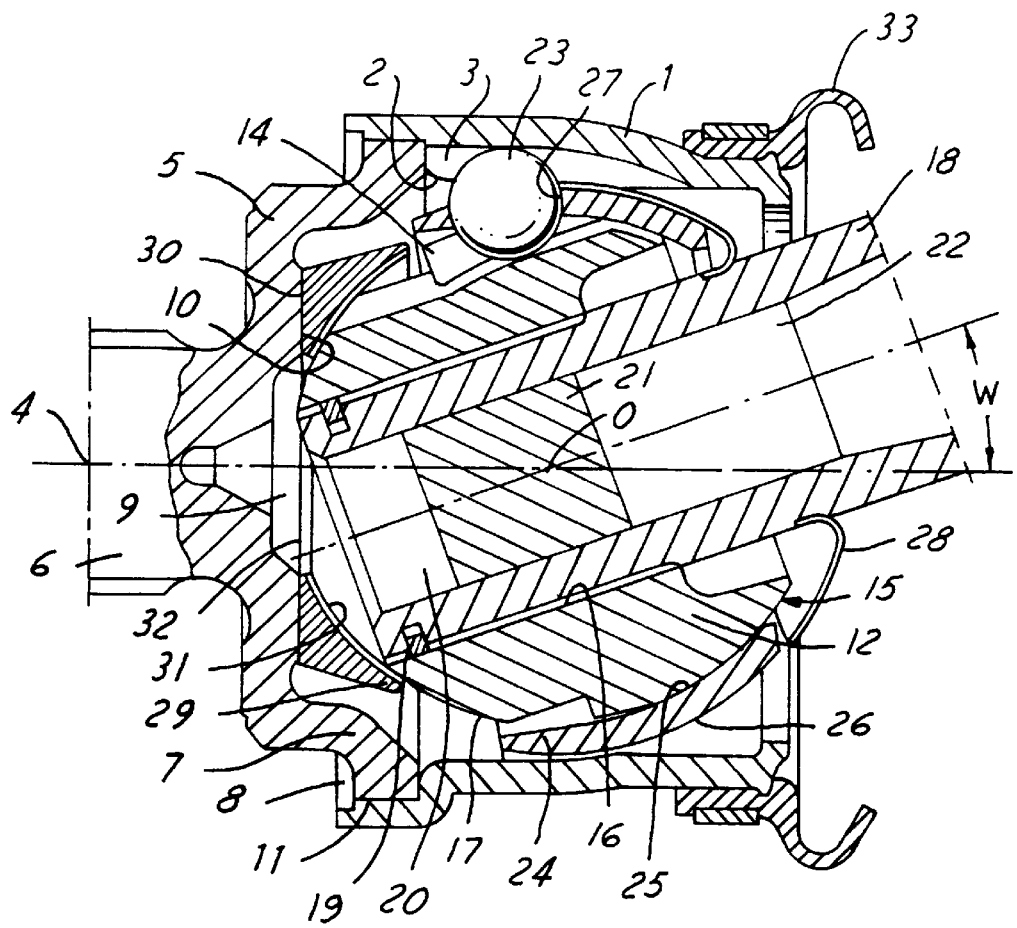
FIG. 1 shows a longitudinal section of a constant velocity universal joint, including a developed view of the outer and inner part relative to one another.
Figure 2:
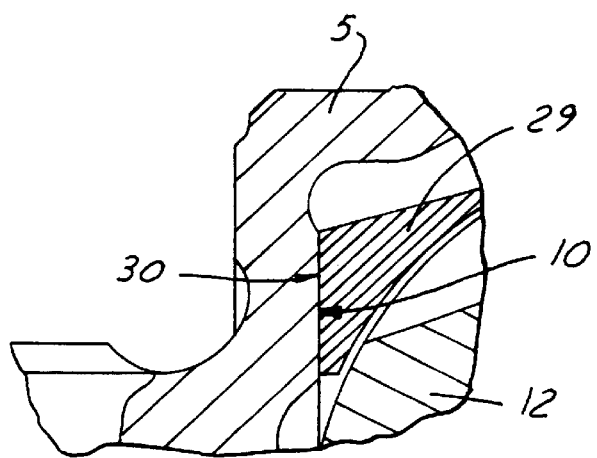
FIG. 2 shows a detail of a portion of FIG. 1.

The constant velocity universal joint shows an outer part 1 provided in the form of a hollow plate metal part and with inner face 2 provided with outer tracks 3 which, with reference to the first longitudinal axis, are circumferentially distributed in meridian planes. Outer part 1 is also associated with a first attaching element 5 which comprises a journal portion 6 for achieving a rotationally fixed connection with a driving or driven part of a driveline. The element 5 also comprises a flange portion 7 whose outer face engages a recess 8 in the outer part 1 and is connected thereto by means of a weld 11, with a low-heat welding process being used for connecting purposes, for example.

Towards the outer part 1 and its cavity, the first attaching element 5 comprises a sliding face 10 which extends perpendicularly relative to the longitudinal axis 4. This means that the longitudinal axis 4 is positioned perpendicularly on the plane formed by the sliding face 10. Furthermore, starting from the sliding face 10, a first chamber 9 is worked into the first attaching element 5 and is centered on the first longitudinal axis 4.

Inner part 12 is received in the cavity of the outer part 1 and provided as a solid formed part centered on second longitudinal axis 13. In the outer face of the inner part 12 there are arranged inner tracks 14 which, with reference to the second longitudinal axis 13, are circumferentially distributed in meridian planes. One inner track 14 and one outer track 3 are always opposite one another, thus forming pairs of tracks. Inner tracks 14 and outer tracks 3 are designed in such a way that relative articulation takes place around the joint articulation center O. Spherical guiding face 15 and a spherical control face 17 are centered on joint articulation center O at the end face of the inner part 14. The control face is arranged opposite the first attaching element 5. However, the two spherical faces may have different sphere diameters.

Furthermore, the inner part 12 comprises a bore 16 which is centered on the second longitudinal axis 13 and provided with teeth into which a second attaching element 18 in the form of a tubular shaft provided with correspondingly shaped teeth is inserted. The two parts are axially secured relative to one another by a securing ring 19. Into the hollow interior of the second attaching element 18 there is inserted a separating element 21 in the form of a plastic plug which is pressed with pretension into the bore of the second attaching element 18. This bore forms the interior of the second attaching element 18.

In front of the separating element 21, towards the first attaching element 5, there is left a space which forms a second chamber 20 arranged opposite first chamber 9 which is formed in the first attaching element 5, starting from the sliding face 10.

The separating element 21 separates the second chamber 20 from the remaining part 22 of the interior of the second attaching element 18. Each track pair consisting of an outer track 3 and an inner track 14 receives a ball 23 for transmitting torque between the outer part 1 and the inner part 12. All balls 23 are guided by a cage 24 in windows 17, so that a plane containing the ball centers extends through the joint articulation center 0. Furthermore, for this purpose, the cage 24, by means of a hollow spherical supporting face 25 provided in the hollow cage interior, is guided on the guiding face 15 of the inner part 12. In addition, the second attaching element 18 is associated with a sealing cap 28 which partially covers the outer face 26 of the cage 24, so that a lubricant reservoir is formed between these and the inner part.

The outer face 26 of the cage 24 is held at a distance from the inner face 2 of the outer part 1 and centered by balls 23. Furthermore, a control element 29 is arranged between the outer part 1 and the attaching element 5 associated therewith on the one hand and the inner part 12 on the other hand. Control element 29 comprises a planar contact face 30 by means of which it is radially adjustably held with reference to the first longitudinal axis against the sliding face 10 of the first attaching element 5. Furthermore, control element 29 comprises a hollow spherical seat face 31 arranged opposite the control face 17 and which supports the inner part 12 by means of the control face 17. In addition, the control element 29 is provided with a central aperture 32 by means of which the two chambers 9, 20 are connected to one another. Finally, at the end where the second attaching element 18 emerges from the outer joint part 1, the joint is sealed by a sealing sleeve 33 which is secured to the outer part 1 by means of its large diameter and to the second attaching element by means of its small diameter. The joint and thus also the two chambers 9, 20 are filled with a grease constituting the lubricant. The drawing shows the joint in the articulated condition, i.e. the two longitudinal axes 4, 13 are arranged at the angle W relative to one another. It can be seen that part of the seat face 31 and part of the control face 17 are free towards the chambers 9, 20 and can be moistened with lubricant. Thus, the invention provides the advantage that in the region of the faces sliding on one another, i.e. on the control face 17 and the seat face 31 and on the contact face 30 on the sliding face 10, it is possible to enclose an amount of lubricant which provides lubrication for the duration of the service life of the joint and which cannot escape into other regions when the joint rotates.

A preferred embodiment has been disclosed. However, a worker in this art will understand that various modifications come within the scope of this invention. To determine the true scope of this invention one should study the following claims.

What is claimed is:

1. A constant velocity universal joint comprising:

a hollow outer part (1) with an inner face (2) provided with outer tracks (3) distributed around a first longitudinal axis (4);

a first attaching element (5) securely connected to said outer part (1), and which closes said outer part (1) and has a sliding face (10) on which said first longitudinal axis (4) is positioned perpendicularly;

an inner part (12) having an outer face with inner tracks (14) circumferentially distributed around a second longitudinal axis (13) as to correspond to said outer tracks (3), and whose outside comprises a spherical guiding face (15) and a spherical control face (17) separated therefrom;

a second attaching element (18) connected to said inner part (12) in a rotationally fixed way;

balls (23) which are each accommodated in said pairs of outer tracks (3) and inner tracks (14);

a cage (24) which, by means of a hollow spherical supporting face (25), is guided on said spherical guiding face (15) of said inner part (12) said cage (24) having an outer face (26) and having windows (27) for guiding said balls (23);

a control element (29) which, by means of a contact face (30), with reference to the first longitudinal axis (4), is radially adjustably supported on said sliding face (10) of said first attaching element (5) associated with said outer part (1), and which comprises a hollow spherical seat face (31), with said inner part (12), by means of said control face (17), being supported on said seat face (31) and with said cage (24), with said outer face (26), being held at a distance from said inner face (2) of said outer part (1) and with said control element (29) comprising a central aperture (32), and further having a sealing sleeve (33) which, at one end, is secured to said outer part (1) and at a second end to said second attaching element (18); and said first attaching element (5) having a first chamber (9) open towards said contact face (30) of said control element (29), at least one of said inner part (12) and said second attaching element (18) connected to said inner part (12), and having a second chamber (20) open towards said seat face (31), and that both chambers (9, 20) communicate with one another through said central aperture (32) and are filled with lubricant.

2. A constant velocity universal joint according to claim 1, wherein said second attaching element (18) is provided in the form of a tubular shaft and that the second chamber (20) is formed by part of the interior of the tubular shaft.

3. A constant velocity universal joint according to claim 2, wherein said part of the second chamber (20) located in the interior of the second attaching element (18) is provided in the form of a tubular shaft separated from the remaining part (22) of the interior by a separating element (21).

4. A constant velocity universal joint according to claim 3, wherein said separating element (21) is formed by a plug.

* * * * *